United States Patent
Hirose et al.

(10) Patent No.: US 6,805,796 B2
(45) Date of Patent: Oct. 19, 2004

(54) WATER TREATMENT APPARATUS

(75) Inventors: Masahiko Hirose, Ibaraki (JP); Atsushi Hiro, Ibaraki (JP); Mark Wilf, San Diego, CA (US)

(73) Assignees: Nitto Denko Corporation (JP); Hydranautics, Oceanside, CA (US)

( * ) Notice: Subject to any disclaimer, the term of this patent is extended or adjusted under 35 U.S.C. 154(b) by 63 days.

(21) Appl. No.: 09/782,339

(22) Filed: Feb. 13, 2001

(65) Prior Publication Data

US 2002/0108900 A1 Aug. 15, 2002

(51) Int. Cl.$^7$ .............................. B01D 63/10
(52) U.S. Cl. .................. 210/321.76; 210/321.75; 210/651; 210/652; 210/639; 210/500.37; 210/500.38
(58) Field of Search ................ 210/651, 652, 210/85, 96.2, 180, 639, 195.2, 746, 154, 500.37, 500.38, 321.75, 321.76; 95/51

(56) References Cited

U.S. PATENT DOCUMENTS

| | | | | |
|---|---|---|---|---|
| 4,046,685 A | * | 9/1977 | Bray | |
| 4,761,234 A | * | 8/1988 | Uemura et al. | 210/500.38 |
| 4,872,984 A | | 10/1989 | Tomaschke | 210/500.38 |
| 4,909,943 A | * | 3/1990 | Fibiger et al. | 210/654 |
| 4,948,507 A | | 8/1990 | Tomaschke | 210/500.38 |
| 5,733,602 A | | 3/1998 | Hirose et al. | 427/245 |
| 5,997,745 A | * | 12/1999 | Tonelli | |
| 6,113,797 A | * | 9/2000 | Al-Samadi | 210/652 |
| 6,190,556 B1 | * | 2/2001 | Uhlinger | |

FOREIGN PATENT DOCUMENTS

| | | | |
|---|---|---|---|
| EP | 1 136 116 A1 | * 8/2000 | |
| EP | 1 136 116 A1 | 9/2001 | B01D/69/12 |
| FR | 2.126.586 | 10/1972 | C02B/1/00 |
| JP | 2-187135 | 7/1990 | |
| JP | 4-145928 | 5/1992 | B01D/61/08 |
| JP | 8-206460 | 8/1996 | |
| JP | 8-224452 | 9/1996 | |
| JP | 10-305216 | 11/1998 | |
| JP | 11-10146 | 1/1999 | C02F/1/44 |
| JP | 2001-137672 | 5/2001 | B01D/63/12 |

OTHER PUBLICATIONS

European Application No. 02711448.7, Office Action dated Feb. 23, 2004.
M. Mulder; "Basic Principles of Membrane Technology"; Chapter VIII, Module and Process Design; Kiuwere Academic Publishers; 1990; pp 314–315.
International Search Report, dated Oct. 22, 2002 (9 pages).
Patent Abstracts of Japan, Publication No. 11010146, Publication Date Jan. 19, 1999 (2 pages) with Partial Translation (2 pages) and Verification of Translation (1 page).
Patent Abstracts of Japan, Publication No. 04145928, Date of Publication May 19, 1992 (2 pages) with Partial Translation (1 page) and Verification of Translation (1 page).
Partial Translation of French Publication No. 2.126.586, Date of Publication Oct. 6, 1972 (2 pages) with Verification of Translation (1 page).
Patent Abstracts of Japan, Publication No. 2001137672, Date of Publication May 22, 2001 (2 pages) with Partial Translation (2 pages) and Verification of Translation (1 page).
Patent Abstracts of Japan, Publication No. 10305216 A, Publication Date Nov. 17, 1998, 1 page.
Patent Abstracts of Japan, Publication No. 08206460 A, Publication Date Aug. 13, 1996, 1 page.

* cited by examiner

*Primary Examiner*—Benjamin L. Utech
*Assistant Examiner*—K S Menon
(74) *Attorney, Agent, or Firm*—Osha & May L.L.P.

(57) ABSTRACT

A water treatment apparatus according to the present invention includes a plurality of composite reverse osmosis membrane modules arranged in multi-stages, each of the modules including a porous support and a polyamide skin layer formed on the porous support. In this apparatus, the module at the final stage is supplied with some of permeated water obtained from at least one module preceding the module at the final-stage, and a rest of the permeated water is discharged from or recovered in the apparatus along with permeated water obtained from the final-stage module.

19 Claims, 3 Drawing Sheets

WATER TREATMENT APPARATUS

BACKGROUND OF THE INVENTION

1. Field of the Invention

The present invention relates to a water treatment apparatus. More particularly, the present invention relates to a water treatment apparatus suitable for converting seawater to freshwater.

2. Description of the Related Art

Seawater contains 4 to 5 mg/l of boron. Therefore, in order to obtain drinking water from seawater, the concentration of boron needs to be reduced to 1 mg/l or less. Conventionally, a two-step treatment using a composite reverse osmosis membrane has been proposed for the purpose of sufficiently reducing the concentration of boron (JP 10(1998)-305216 A, JP 8(1996)-206460 A, etc.). However, according to this treatment method, although the concentration of boron is reduced, other necessary ions are also removed. Accordingly, ions need to be added after treatment. Typically, a spiral module formed by winding a composite reverse osmosis membrane around a water-collecting pipe is used for water treatment. Conventional water treatment methods require a large number of such modules, which is economically problematic.

SUMMARY OF THE INVENTION

Therefore, with the foregoing in mind, one aspect of the present invention is to provide a water treatment apparatus for economically treating water that can sufficiently reduce boron while maintaining ions necessary for living bodies.

In order to achieve this, the water treatment apparatus according to the present invention includes a plurality of composite reverse osmosis membrane modules arranged in multi-stages, each of the modules including a porous support and a polyamide skin layer formed on the porous support, the plurality of modules including a final-stage module and at least one module preceding the final-stage module (hereinafter, referred to as "pre-final module"). The apparatus is characterized in that some permeated water obtained from the at least one pre-final module is supplied to the final-stage module, and the remaining permeated water is discharged from or recovered in the apparatus along with permeated water obtained from the final-stage module.

According to this apparatus, when raw water to be treated is seawater, a concentration of boron can be reduced while maintaining the levels of ions necessary for living bodies. In addition, the apparatus requires fewer modules.

In the apparatus according to the present invention, it is preferable that the permeated water from the final-stage module and the permeated water that is not supplied from the at least one pre-final module to the final-stage module are mixed with each other to be discharged or recovered.

In this apparatus, seawater (a TDS concentration of 4.1%, a boron concentration of 5 mg/l, a temperature of 28° C.) was supplied to the first pressure vessel from its one end at a pressure of 6.3 MPa. A recovery ratio (the amount of the permeated water/the amount of the feed water) in the first pressure vessel was 50%. In the permeated water on the raw water side (upstream) of the first pressure vessel, the concentration of boron was 0.55 mg/l and the concentration of TDS was 110 mg/l. On the other hand, in the permeated water on the concentrate side (downstream) of the first pressure vessel, the concentration of boron was 10.9 mg/l and the concentration of TDS was about 490 mg/l. Further, a volume ratio (X:Y) of the amount of the permeated water on the upstream and the amount of the permeated water on the downstream was 1:1.4. Then, the pH of the permeated water on the downstream was adjusted to 9.5 using sodium hydroxide and supplied to the second pressure vessel at a pressure of 0.8 MPa. A recovery ratio in the second pressure vessel was 85%. In the permeated water obtained from the second pressure vessel, the concentration of boron was 0.7 mg/l and the concentration of TDS was 16 mg/l. Then, the permeated water (C) on the upstream side of the first pressure vessel and the permeated water (D) obtained from the second pressure vessel were mixed with each other (mixing ratio by volume C:D=1.6:1). In the mixed water thus obtained, the concentration boron was 0.6 mg/l and the concentration of TDS was 74 mg/l. The quality of the mixed water was satisfactory for drinking water and in addition, there was no need to add ions separately.

In the apparatus according to the present invention, the permeated water supplied to the final-stage module is preferably alkaline, for example, having a pH of 8 to 12, preferably 9 to 12, and more preferably 9 to 11. The reason for this is that boron in the permeated water thus adjusted in alkaline pH is in a dissociated state and can be more easily removed.

In the apparatus according to the present invention, the permeated water supplied to the final-stage module is preferably discharged from a concentrate side of at least one module supplying the permeated water to the final-stage module. This can help an ion concentration of the permeated water discharged from or recovered in the apparatus as a whole to be more efficiently reduced.

In one example, the above-mentioned water treatment apparatus has the following structure so that the permeated water discharged from the concentrate side is supplied to the final-stage module. That is, the water treatment apparatus further includes a pressure vessel. The apparatus is characterized in that a plurality of pre-final modules are provided as the above-mentioned at least one pre-final module, each of the plurality of pre-final modules is a spiral module formed by winding a composite reverse osmosis membrane around a water-collecting pipe, the plurality of pre-final modules are connected with each other by connecting their water-collecting pipes, the plurality of pre-final modules thus connected are contained in the plurality of pressure vessels, raw water to be treated is supplied to and permeated water is discharged from one end of the pressure vessel, concentrated water and permeated water are discharged from the other end of the pressure vessel, and the permeated water discharged from the other end is supplied to the final-stage module. In the apparatus according to this example, the method for taking out the permeated water from both the end of the pressure vessel is not specifically limited. For example, an amount of the permeated water may be adjusted by bulbs provided in outlet pipes at both the ends of the pressure vessel. Further, an interior space of the connected water-collecting pipes may be divide into two separate spaces by a partition to separate permeated water on a raw water side and permeated water on a concentrate side. In this case, the volume ratio (X:Y) of the amount of the permeated water on the raw water side (upstream) and the amount of the permeated water on the concentrate side (downstream) is in the range of, for example, 1:5 to 9:1, preferably 1:1.5 to 9:1, and more preferably 1:1 to 4:1.

In another example, the water treatment apparatus has the following structure so that the permeated water discharged from the concentrate side is supplied to the final-stage module. That is, the water treatment apparatus further includes a plurality of pressure vessels arranged in multi-stages, the plurality of pressure vessels including a first-stage pressure vessel and at least one pressure vessel subsequent to the first-stage pressure vessel. The apparatus is characterized in that a plurality of pre-final modules are provided as the above-mentioned at least one pre-final module, each of the plurality of pre-final modules is a spiral module formed by winding a composite reverse osmosis membrane around a water-collecting pipe, the plurality of pre-final modules are connected with each other by connecting their water-collecting pipes, the plurality of pre-final modules thus connected are contained in the pressure vessel, the first-stage pressure vessel is supplied with raw water to be treated, the at least one pressure vessel subsequent to the first-stage pressure vessel is supplied with concentrated water discharged from at least one preceding pressure vessel, and the final-stage module is supplied with permeated water discharged from the at least one pressure vessel subsequent to the first-stage pressure vessel.

More specific example of the apparatus according to this example includes three pressure vessels arranged in three stages, and permeated water from a second-stage pressure vessel and/or a third-stage pressure vessel is supplied to a final-stage composite reverse osmosis membrane.

In the water treatment apparatus according to the present invention, it is preferable that the at least one pre-final module has a salt rejection of at least 99% and a permeate flux of at least 0.2 m³/m²·day when the apparatus is operated using as a feed solution a 3.5 wt % salt water at a pH of 6.5, a water temperature of 25° C., and an operational pressure of 5.5 MPa. It is more preferable that these modules have a salt rejection of at least 99.5% and a permeate flux of at least 0.3 m³/m²·day under the same conditions.

In the water treatment apparatus according to the present invention, it is preferable that the at least one pre-final module has a boron rejection of at least 80% when the apparatus is operated using as a feed solution a 3.5 wt % salt water containing 5 ppm of boron at a pH of 6.5, a water temperature of 25° C., and an operational pressure of 5.5 MPa. It is more preferable that these modules have a boron rejection of at least 90% under the same conditions.

In the water treatment apparatus according to the present invention, it is preferable that the final-stage composite reverse osmosis membrane module has a salt rejection of at least 98% and a permeate flux of at least 0.5 m³/m²·day when the apparatus is operated using as a feed solution a 0.05 wt % salt water a pH of 6.5, at a water temperature of 25° C., and an operational pressure of 0.75 MPa. It is more preferable that the module has a salt rejection of not less than 99.0% and a permeate flux of not less than 0.7 m³/m²·day under the same conditions.

It should be noted here that the term "permeate flux" as used herein refers to an amount of a solution that permeates a unit area of the composite reverse osmosis membrane per unit time. Further, a rejection for a substance to be rejected (a rejection for salt, a rejection for boron, etc.) is defined by the following equation:

Rejection(%)=(1−(the concentration of the substance in the permeate solution/the average concentration of the substance in the feed solution))×100.

These and other advantages of the present invention will become apparent to those skilled in the art upon reading and understanding the following detailed description with reference to the accompanying figures.

DESCRIPTION OF THE PREFERRED EMBODIMENTS

Figure 1:
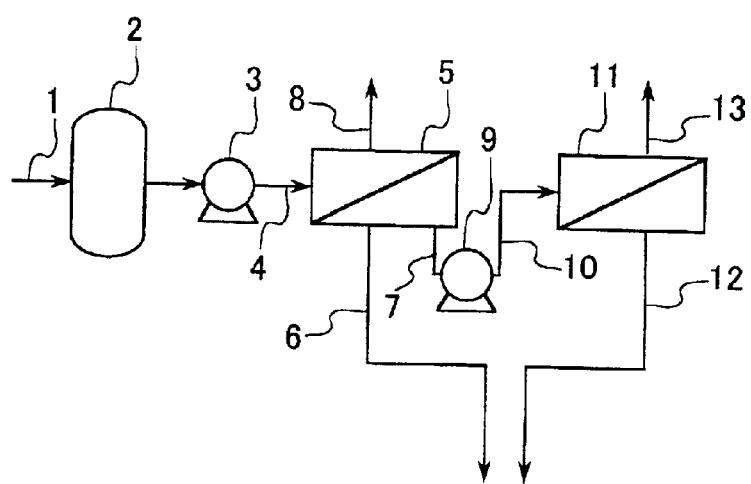
FIG. 1 schematically shows a structure of a water treatment apparatus according to one example of the present invention.

A composite reverse osmosis membrane used in the present invention may include a polyamide-based skin layer (referred to as an active layer or a thin layer) on a microporous support. In general, a polyamide-based composite reverse osmosis membrane is favorable to use because it has a high rejection for various ions and a high permeate flux. As a specific polyamide-based skin layer, an aromatic cross-linked polyamide skin layer may be used. The aromatic cross-linked polyamide skin layer may be formed by reacting an aromatic compound having at least two reactive amino groups with a polyfunctional acid halide compound having at least two reactive acid halide groups.

The aromatic compound having at least two reactive amino groups (hereinafter, referred to also as "polyfunctional amine") is not limited to a specific compound, and can be, for example, m-phenylene diamine, p-phenylene diamine, 1,3,5-triaminobenzene, 1,2,4-triaminobenzene, 3,5-diaminobenzoic acid, 2,4-diaminotoluene, 2,4-diaminoanisole, amidol, xylylene diamine, or the like. Preferably, m-phenylene diamine, p-phenylene diamine, or triaminobenzene can be used. Among these, m-phenylene diamine or triaminobenzene are more preferable.

Further, these aromatic polyfunctional amines can be used in combination with aliphatic or alicyclic polyfunctional amines. Examples of such aliphatic polyfunctional amines include ethylene diamine, propylene diamine, and tris(2-aminoethyl) amine. Examples of such alicyclic polyfunctional amines include 1,3-diaminocyclohexane, 1,2-diaminocyclohexane, 1,4-diaminocyclohexane piperazine, 2,5-dimethyl piperazine, and 4-aminomethyl piperazine.

The polyfunctional acid halide (hereinafter, referred to also as "acid halide") is not specifically limited, and can be, for example, aromatic, aliphatic, or alicyclic polyfunctional acid halides. Preferably, aromatic polyfunctional acid halides can be used.

Examples of the aromatic polyfunctional acid halides include trimesic acid chloride, terephthalic acid chloride, isophthalic acid chloride, biphenyl dicarboxylic acid chloride, naphthalene dicarboxylic acid dichloride, benzene trisulfonic acid chloride, benzene disulfonic acid chloride, and chlorosulfonyl benzene dicarboxylic acid chloride. Among these, monocyclic aromatic compounds are preferable.

Examples of the aliphatic polyfunctional acid halides include propane tricarboxylic acid chloride, butane tricarboxylic acid chloride, pentane tricarboxylic acid chloride, glutaryl halide, and adipoyl halide.

Examples of the alicyclic polyfunctional acid halides include cyclopropane tricarboxylic acid chloride, cyclobutane tetracarboxylic acid chloride, cyclopentane tricarboxylic acid chloride, cyclopentane tetracarboxylic acid chloride, cyclohexane tricarboxylic acid chloride, tetrahydrofuran tetracarboxylic acid chloride, cyclopentane dicarboxylic acid chloride, cyclobutane dicarboxylic acid chloride, cyclohexane dicarboxylic acid chloride, and tetrahydrofuran dicarboxylic acid chloride.

The microporous support is also not limited to a specific type, as long as it can support the polyamide skin layer. For example, the microporous support may be formed of polyarylethersulfone such as polysulfone and polyether sulfone, polyimide, polyvinylidene fluoride, or the like. A microporous supporting membrane made of polysulfone or polyarylethersulfone is preferred because of its chemical, mechanical and thermal stability. The microporous support generally has a thickness of about 25 to 125 µm, preferably about 40 to 75 µm, but the thickness is not necessarily limited thereto.

Next, the polyamide skin layer based on cross-linked polyamide can be formed on a microporous support by interfacial polymerization between the polyfunctional amine component and the acid halide component. For example, a solution containing the polyfunctional amine component is applied onto a microporous support to form a first layer, and then a solution containing the acid halide component is applied onto the first layer to form a second layer on the first layer, after which extra aqueous solutions are removed from the respective layers. The microporous support having the first and second layers formed thereon is then dried by heat treatment at about 20 to 150° C., preferably at about 70 to 130° C. for about 1 to 10 minutes, preferably for about 2 to 8 minutes. Thus, interfacial polycondensation occurs to form a thin water permeable membrane (polyamide skin layer) made of cross-linked polyamide. The thickness of this thin membrane is generally about 0.05 to 2 µm, preferably about 0.10 to 1 µm.

The solution containing the polyfunctional amine component may further contain a small amount of polymer such as polyvinyl alcohol, polyvinyl pyrolidone, polyacrylic acid or the like or polyhydric alcohol such as sorbitol, glycerin or the like to facilitate the production of the membrane or to improve the performance of the resultant composite reverse osmosis membrane.

Furthermore, a compound having a solubility parameter (described in JP8-224452A) of 8 to 14 $(cal/cm^3)^{1/2}$ can be added to the solution containing the polyfunctional amine component or the solution containing the acid halide component or both, for the purpose of increasing the permeate flux. The solubility parameter refers to an amount defined by $(\Delta H/V)^{1/2}$ $(cal/cm^3)^{1/2}$, where the molar evaporative heat of a liquid is $\Delta H$ cal/mol, and the molar volume is V $cm^3$/mol. Examples of a substance having such a solubility parameter include alcohols, ethers, ketones, esters, halogenated hydrocarbons, and sulfur-containing compounds, and specific examples thereof are described in JP 8-224452A.

An amine salt, as described in JP 2-187135A, for example, a salt of tetraalkyl ammonium halide or trialkyl amine and an organic acid can also be added to the solution containing polyfunctional amine component or the solution containing an acid halide component or both, because this type of salt facilitates production of the membrane, improves the absorptivity of the amine solution to the support, and accelerates the condensation reaction.

The solution containing polyfunctional amine component or the solution containing an acid halide component or both can contain a surfactant such as sodium dodecyl benzene sulfonate, sodium dodecyl sulfate, sodium lauryl sulfate or the like. These surfactants have the effect of improving the wettability and facilitate the absorption of the solution containing polyfunctional amine component to the microporous support.

In order to accelerate the polycondensation reaction at the interface, sodium hydroxide or tribasic sodium phosphate, which can remove hydrogen halide produced in the interfacial reaction, can be added to the solution containing polyfunctional amine component or the solution containing an acid halide component or both. Further, it is useful to use an acylation catalyst or the like as a catalyst.

The concentration of the acid halide in the solution containing acid halide component and the concentration of the polyfunctional amine in the solution containing polyfunctional amine component are not specifically limited. The concentration of the acid halide generally is 0.01 to 5 wt %, preferably 0.05 to 1 wt %, and the concentration of the polyfunctional amine generally is 0.1 to 10 wt %, preferably 0.5 to 5 wt %.

As a composite reverse osmosis membrane provided at the first stage, the one suitable for treating a solution with a high salt concentration is preferably used for improving the quality of permeated water because raw water with a high salt concentration is supplied to the composite reverse osmosis membrane at the first stage. The composite reverse osmosis membrane preferably has a salt rejection of at least 99% and a permeate flux of at least 0.2 $m^3/m^2$·day, more preferably a salt rejection of at least 99.5% and a permeate flux of at least 0.3 $m^3/m^2$·day when the water treatment apparatus is operated using as a feed solution a 3.5 wt % salt water (pH 6.5) at a water temperature of 25° C. and an operational pressure of 5.5 MPa. Further, in the case of treating seawater, it is preferable that the membrane has a high boron rejection. The membrane preferably has a boron rejection of at least 80%, more preferably at least 90%, when the apparatus is operated using as a feed solution a 3.5 wt % salt water (pH 6.5) containing 5 ppm of boron, at a water temperature of 25° C. and an operational pressure of 5.5 MPa. A method for obtaining the above-mentioned composite reverse osmosis membrane with a high boron rejection is not specifically limited. Examples of the method include a membrane treatment using high temperature water and a bromine addition. In the case of performing the bromine addition, the ratio (Br/N) of bromine atoms (Br) to nitrogen atoms (N) of amino groups in the polyamide skin layer of the membrane is preferably in the range of 0.1 to 1.0.

The raw water supplied to a composite reverse osmosis membrane at the second stage has a low concentration of ions because it has passed through the composite reverse osmosis membrane at the first stage. Therefore, the composite reverse osmosis membrane with a high salt rejection and a high permeate flux is preferable for improving the quality of permeated water, and also by economic consideration. The composite reverse osmosis membrane preferably has a salt rejection of at least 98% and a permeate flux of at least 0.5 $m^3/m^2$·day, more preferably a salt rejection of at least 99.0% and a permeate flux of at least 0.7 $m^3/m^2$·day when the apparatus is operated using as a feed solution a 0.05 wt % salt water (pH of 6.5) at a water temperature of 25° C. and an operational pressure of 0.75 MPa. A method for obtaining the composite reverse osmosis membrane with a high salt rejection and a high permeate flux is not specifically limited. For example, it can be performed by having a compound with a solubility parameter of 8 to 14 $(cal/cm^3)^{1/2}$ present in the reaction field.

In the water treatment apparatus according to the present invention, a composite reverse osmosis membrane is used in the form of a module. The module is not specifically limited to a specific type, and can be, for example, a spiral module. The spiral module is formed by winding the composite reverse osmosis membrane around a water-collecting pipe.

The water treatment apparatus according to the present invention is suitably used for treating raw water containing a high concentration of total dissolved solids (TDS). The apparatus is preferably used for treating the raw water with a TDS concentration of 1% or more, and most preferably for treating seawater with a TDS concentration of 3.5%.

Next, an example of a water treatment apparatus according to the present invention will be explained with reference to the drawings. It should be noted that the composite reverse osmosis membrane modules shown in the drawings are all spiral-type.

FIG. 1 shows a basic structure of a water treatment apparatus according to one example the present invention. As can be seen, the apparatus includes a first-stage composite reverse osmosis membrane module 5 and a final-stage composite reverse osmosis membrane module 11, and further a pretreatment unit 2. The pretreatment unit 2 can remove insolubles or the like contained in raw water by filtering or adjust the pH of the raw water. The pretreatment unit 2 is provided with a pipe 1 for introducing water to be treated (raw water) thereinto. Further, the pretreatment unit 2 is connected to the first-stage module 5 by a pipe 4 having a pump 3. The first-stage module 5 is provided with two pipes 6 and 7 extending from its permeate side. The pipe 7 is connected to a pump 9. The pipe 6 is connected to a recovery tank (not shown) provided in the apparatus or extends to the outside of the apparatus. The first-stage module 5 is further provided with a pipe 8 extending outside the apparatus from its concentrate side. A pipe 10 extending from the pump 9 is introduced into the final-stage module 11. The final-stage module 11 is provided with a pipe 13 extending from its concentrate side to the outside of the apparatus and a pipe 12 extending from its permeate side to be connected to a recovery tank (not shown) provided in the water treatment apparatus or to the outside of the apparatus.

Water treatment using this apparatus can be carried out, for example, in the following manner. First, through the pipe 1, raw water is introduced into the pretreatment unit 2, in which the raw water is pretreated by filtering or the like. The raw water thus pretreated flows through the pipe 4 and supplied to the first-stage module 5 by being pressurized by the pump 3. Then, in the module 5, the raw water is separated into concentrated water and permeated water. The concentrated water is discharged outside the apparatus through the pipe 8. On the other hand, some of the permeated water is supplied to the pump 9 through the pipe 7 and further to the final-stage module 11 through the pipe 10 by being pressurized by the pump 9. The rest of the permeated water is recovered in the tank provided in the apparatus or discharged outside the apparatus through the pipe 6. In the final-stage module 11, the supplied water is separated into concentrated water and permeated water. The concentrated water is discharged outside the apparatus through the pipe 13, and the permeated water is recovered in the tank provided in the apparatus or discharged outside the apparatus through the pipe 12. In this water treatment apparatus, it is preferable that the permeated water obtained from the pipe 6 of the first-stage module 5 (i.e., the above-mentioned rest of the permeable water) and the permeated water obtained from the pipe 12 of the final-stage module 11 are mixed with each other.

Figure 2:
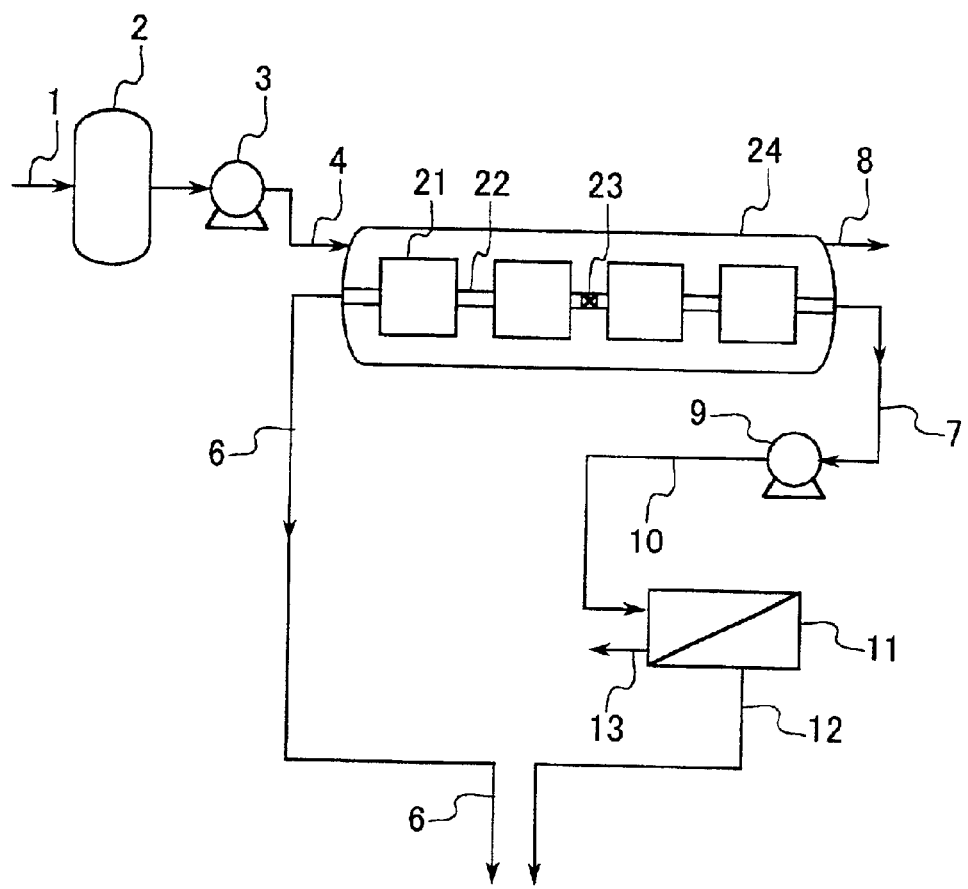
FIG. 2 schematically shows a structure of a water treatment apparatus according to another example of the present invention.

FIG. 2 shows a structure of a water treatment apparatus according to another example of the present invention. The water treatment apparatus shown in FIG. 2 is the apparatus according to the above-mentioned one example, in which the permeated water discharged from the concentrate side is supplied to the final-stage module and a plurality of composite reverse osmosis membrane modules are provided preceding the final-stage module are contained in a pressure vessel. It is to be noted that portions in common between FIG. 1 and FIG. 2 are numbered identically.

As can be seen, similarly to the apparatus shown in FIG. 1, the apparatus according to this example includes a pretreatment unit 2. The pretreatment unit 2 provided with a pipe 1 for introducing raw water thereinto and a pipe 4 for discharging the pretreated water therefrom. The pipe 4 is connected to a pressure vessel 24 through a pump 3. In this apparatus, four composite reverse osmosis membrane modules 21 are provided preceding a final-stage composite reverse osmosis membrane module 11. These four modules 21 are connected in series by connecting their water-collecting pipes 22 and contained in the pressure vessel 24. Among these water-collecting pipes 22, the pipe positioned approximately in the middle of the pressure vessel 24 has a partition 23 inside, which divides an interior space of the connected water-collecting pipes into two separate spaces. A pipe 6 extends from one end of the pressure vessel 24 to discharges the permeated water on the raw water supplying side while a pipe 7 extends from the other end to discharge the permeated water on the concentrate side. The pipe 7 is connected to a pump 9. A pipe 10 extending from the pump 9 is introduced into the final-stage module 11. The pressure vessel 24 is further provided with a pipe 8 extending from its concentrate side to discharge concentrated water. The final-stage composite reverse osmosis membrane module 11 is provided with a pipe 12 for discharging permeated water and a pipe 13 for discharging concentrated water.

Water treatment using this apparatus can be carried out, for example, in the following manner. First, through the pipe 1, raw water is introduced into the pretreatment unit 2, in which impurities and the like contained in the raw water can be removed by, for example, filtering. The raw water thus pretreated is introduced into the pressure vessel 24 through the pipe 4 by being pressurized by the pump 3. The water introduced into the pressure vessel 24 is separated by the four composite reverse osmosis membrane modules 21 connected in series. The water permeated through the membranes is collected in the water-collecting pipes 22, in which the permeated water on the raw water supplying side and the permeated water on the concentrate side are separated by the partition 23. The permeated water on the raw water supplying side discharged from the pressure vessel 24 is discharged outside the apparatus or recovered in a tank (not shown) provided in the apparatus through the pipe 6. On the other hand, the permeated water on the concentrate side is discharged from the pressure vessel 24 through the pipe 7 and introduced into the final-stage module 11 through the pipe 10 by being pressurized by the pump 9. In the mean time, the concentrated water discharged from the pressure vessel 24 flows through the pipe 8 to be discharged outside the apparatus. In the final-stage module 11, the supplied water is further separated into permeated water and concentrated water, and the permeated water is discharged outside the apparatus through the pipe 12 or recovered in the tank (not shown) provided in the apparatus. The permeated water obtained from this pipe 12 and the permeated water from the above-mentioned pipe 6 are preferably mixed with each other to be discharged or recovered. Further, the concentrated water obtained from the final-stage module 11 is discharged outside the apparatus through the pipe 13.

In this apparatus, four modules are contained in the pressure vessel 24, but the present invention is not limited thereto. In this embodiment, 2 to 10 composite reverse osmosis membrane modules may be connected in series. Preferably, 4 to 10 modules are connected in series. It is to be noted that, when a plurality of composite reverse osmosis membrane modules connected in series are contained in the pressure vessel, the connected modules as a whole can be regarded as one composite reverse osmosis membrane module.

Figure 3:
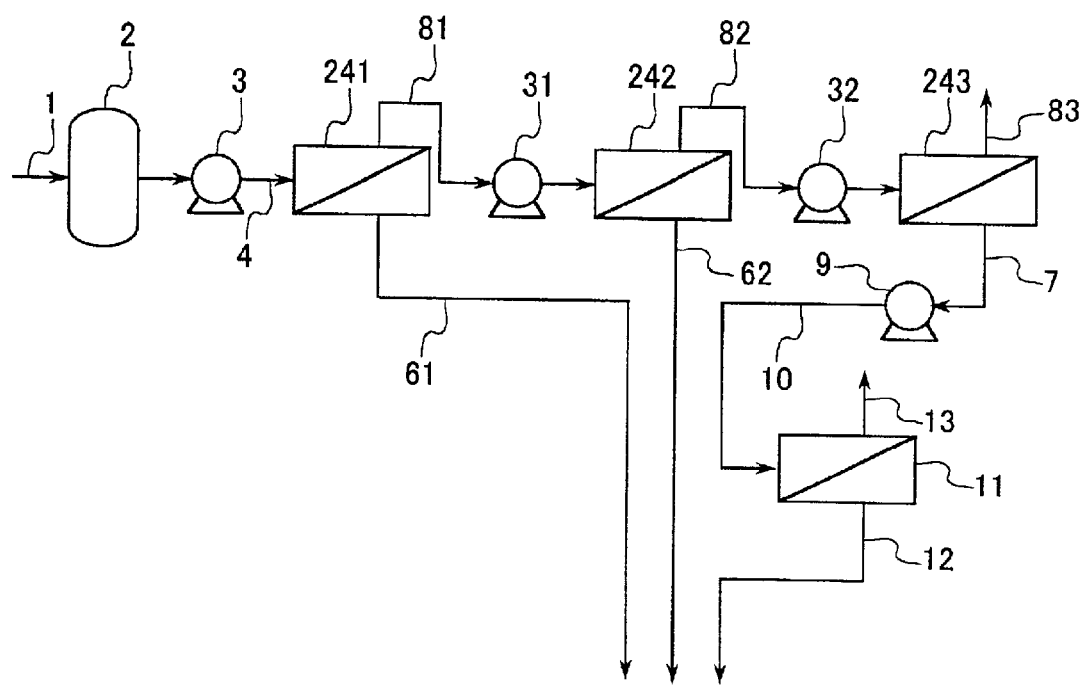
FIG. 3 schematically shows a structure of a water treatment apparatus according to still another example of the present invention.

FIG. 3 shows a structure of a water treatment apparatus according to still another example the present invention. The water treatment apparatus shown in FIG. 3 is the apparatus according to the above-mentioned another example, in which the permeated water discharged from the concentrate side is supplied to the final-stage module and a plurality of pressure vessels each containing a plurality of composite reverse osmosis membrane modules are provided. It is to be noted that portions in common between FIG. 3 and FIGS. 1, 2 are numbered identically.

As can be seen, the apparatus according to this example includes a pretreatment unit 2, three pressure vessels 241, 242, and 243, and a final-stage composite reverse osmosis membrane module 11 as main components. Each of the three pressure vessels 241, 242, and 243 contains two or three composite reverse osmosis membrane modules (not shown) connected in series by connecting their water-collecting pipes. The pretreatment unit 2 is provided with a pipe 1 for introducing raw water thereinto. The pretreatment unit 2 is further provided with a pipe 4 having a pump 3, which is introduced into a first pressure vessel 24. The first pressure vessel 241 is provided with a pipe 61 for discharging permeated water and a pipe 81 for discharging concentrated water. The pipe 81 has a pump 31 and the leading end thereof is introduced into a second pressure vessel 242. The second pressure vessel 242 is provided with a pipe 62 for discharging permeated water and a pipe 82 for discharging concentrated water. The pipe 82 has a pump 32 and the leading end thereof is introduced into a third pressure vessel 243. The third pressure vessel 243 is provided with a pipe 83 for discharging concentrated water and a pipe 7 for discharging permeated water The pipe 7 has a pump 9, and a pipe 10 extending from the pump 9 is introduced into the final-stage module 11. The final-stage module 11 is provided with a pipe 13 for discharging concentrated water and a pipe 12 for discharging permeated water.

Water treatment using this apparatus can be carried out, for example, in the following manner. First, through the pipe 1, raw water is introduced into the pretreatment unit 2, in which the raw water is pretreated by, for example, filtering. The raw water thus pretreated flows through the pipe 4 and introduced into the first pressure vessel 241 by being pressurized by the pump 3. The water introduced into the first pressure vessel 241 is separated therein. In the first pressure vessel 241, the permeated water is discharged outside the apparatus or recovered in a tank (not shown) provided in the apparatus through the pipe 61, while the concentrated water is introduced into the second pressure vessel 242 through the pipe 81 by being pressurized by the pump 31. The water introduced into the second pressure vessel 242 is separated therein. In the second pressure vessel 242, the permeated water is discharged outside the apparatus or recovered in a tank (not shown) provided in the apparatus through the pipe 62, while the concentrated water is introduced into the third pressure vessel 243 through the pipe 82 by being pressurized by the pump 32. The water introduced into the third pressure vessel 243 is separated therein. In the third pressure vessel 243, the concentrated water is discharged outside the apparatus through the pipe 83, while the permeated water is introduced into the pump 9 through the pipe 7 and then introduced into the final-stage module 11 through the pipe 10 by being pressurized by the pump 9. The water introduced into the final-stage module 11 is separated therein. In the final-stage module 11, the concentrated water is discharged outside the apparatus through the pipe 13, while the permeated water is discharged outside the apparatus or recovered in a tank (not shown) provided in the apparatus through the pipe 12. The permeated water obtained from the pipes 61, 62, and 12 is preferably mixed with each other to be discharged or recovered. It is to be noted that the pumps 31 and 32 for pressurizing in FIG. 3 are not necessarily provided.

In the water treatment apparatus according to this example, three pressure vessels (each containing two or three composite reverse osmosis membrane modules) are arranged in series, but the present invention is not limited thereto. For example, 2 to 5 pressure vessels may be arranged in series. Further, when three pressure vessels are arranged, the permeated water obtained from the third pressure vessel is preferably supplied to the final-stage composite reverse osmosis membrane module.

Furthermore, in the water treatment apparatus according to the present invention, only one final-stage composite reverse osmosis membrane module may be provided. However, for example, the final-stage module may be provided in the form of a pressure vessel containing a plurality of composite reverse osmosis membrane modules connected in series by their water-collecting pipes. The plurality of modules thus connected also can be regarded as one large-sized composite reverse osmosis membrane module.

EXAMPLES

Hereinafter, the present invention will be described more specifically by way of example, but the present invention is not limited thereto.

Example 1

A spiral module A of a composite reverse osmosis membrane was fabricated through the following procedure.

An aqueous solution containing 3 wt % of m-phenylenediamine, 0.25 wt % of sodium lauryl sulfate, 2 wt % of triethylamine, and 4 wt % of camphor sulfonic acid was prepared. The aqueous solution was applied to a microporous support (polysulfone-based ultrafiltration membrane), and thereafter, extra aqueous solution was removed so that a layer of the aqueous solution was formed on the support. Afterwards, an isooctane solution containing 0.1 wt % of trimesic acid chloride and 0.15 wt % of isophthalic acid chloride was brought into contact with this layer. The support having the layer was then held in an oven at 120° C. for 3 minutes so that a thin polymer membrane was formed on the microporous support. Thus, a composite reverse osmosis membrane was obtained. This composite reverse osmosis membrane was processed into a spiral module (a diameter of 201 mm and a length of 1016 mm). An aqueous solution (pH of 6.0) containing free chlorine (20 mg/l) and sodium bromide (20 mg/l) was passed through the spiral module at an operational pressure of 1.5 MPa for 30 minutes. When the performance of the spiral module A was evaluated by using as a feed solution a 3.5 wt % salt water containing 5 ppm of boron at a water temperature of 25° C., pH of 6.5, and an operational pressure of 5.5 MPa, the salt rejection was 99.6% and the boron rejection was 90%, and the permeate flux was 0.5 m$^3$/m$^2$·day.

On the other hand, a spiral module B of a composite reverse osmosis membrane was fabricated through the following procedure.

An aqueous solution containing 2 wt % of m-phenylenediamine, 0.25 wt % of sodium lauryl sulfate, 2 wt % of triethylamine, and 4 wt % of camphor sulfonic acid, and 8 wt % of isopropyl alcohol was prepared. The aqueous solution was applied to a microporous support (polysulfone-based ultrafiltration membrane), and thereafter, extra aqueous solution was removed so that a layer of the aqueous solution was formed on the support. Afterwards, an isooctane solution containing 0.15 wt % of trimesic acid chloride was brought into contact with this layer. The support having the layer was then held in an oven at 120° C. for 3 minutes so that a thin polymer membrane was formed on the microporous support. Thus, a composite reverse osmosis membrane was obtained. This composite reverse osmosis membrane was processed into a spiral module (a diameter of 201 mm and a length of 1016 mm). When the performance of the spiral module B was evaluated by using as a feed solution a 0.05 wt % salt water at a water temperature of 25° C., pH of 6.5, and an operational pressure of 0.75 MPa, the salt rejection was 99.6% and the permeate flux was 0.9 $m^3/m^2 \cdot day$.

Subsequently, the water treatment apparatus having a structure as shown in FIG. 2 was fabricated using these spiral modules A and B.

First, eight spiral modules A described above were connected in series by connecting their water-collecting pipes and the modules thus connected were contained in a first pressure vessel. Further, in the above-mentioned eight spiral modules A thus connected, a partition was provided in the connection between the water-collecting pipes of the third and forth modules so that the permeated waters can be discharged from both ends of the pressure vessel. On the other hand, eight spiral modules B described above were connected in series by connecting their water-collecting pipes and the modules thus connected were contained in a second pressure vessel. The second pressure vessel was used as a final-stage module, and the permeated water from the concentrate side of the first pressure vessels was supplied to the second pressure vessels.

In the apparatus according to the present invention, a ratio (A:B) of an ion concentration (A) of the permeated water supplied to the final-stage module and an ion concentration (B) of the permeated water that is not supplied to the final-stage module is preferably in a range of 2:1 to 10:1, and more preferably 3:1 to 8:1. In this case, a concentration of total dissolved solids (TDS) in the raw water supplied to the apparatus is preferably at least 1 wt % and the raw water supplied to the apparatus is preferably seawater. When the raw water supplied to the apparatus is seawater, a concentration of boron in permeated water discharged from or recovered in the apparatus is preferably 1 mg/l or less, which also applies to the case where the mixed permeated water is discharged from or recovered in the apparatus.

Comparative Example 1

A water treatment apparatus was configured similarly to the above-mentioned example 1, except that all the permeated water from the first pressure vessel was supplied to the second pressure vessel. In the permeated water obtained from the first pressure vessel, the concentration of boron was 1.1 mg/l and the concentration of TDS was 270 mg/l. Although the TDS concentration met the standard for drinking water, but the boron concentration did not meet the standard for drinking water. On the other hand, in permeated water obtained from the second pressure vessel, the concentration of boron was 0.3 mg/l and the concentration of TDS was 10 mg/l. Although the boron concentration was sufficiently low, the TDS concentration was too low for drinking water. Accordingly, it was necessary to add ions separately. Furthermore, in order to obtain drinking water, the apparatus required 2.4 times the number of the spiral modules B in the example 1, which was not economical.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A water treatment apparatus comprising
   a plurality of composite reverse osmosis membrane modules arranged in multi-stages,
   each of the plurality of modules including a porous support and a polyamide skin layer formed on the porous support,
   the plurality of modules including a final-stage module and at least one pre-final module, wherein the polyamide skin layer in the at least one pre-final module comprises bromine atoms introduced into the polyamide skin layer by treating the polyamide skin layer with a free chlorine aqueous solution containing a bromine compound,
   wherein a selected portion of permeated water obtained from the at least one pre-final module is supplied to the final-stage module, and
   a rest of the permeated water is discharged from or recovered in the apparatus along with permeated water obtained from the final-stage module.

2. The water treatment apparatus according to claim 1, wherein the permeated water from the final-stage module and the permeated water that is not supplied from the at least one pre-final module to the final-stage module are mixed with each other to be discharged or recovered.

3. The water treatment apparatus according to claim 1, wherein a ratio (A:B) of an ion concentration (A) of the permeated water supplied to the final-stage module and an ion concentration (B) of the permeated water that is not supplied to the final-stage module is in a range of 2:1 to 10:1.

4. The water treatment apparatus according to claim 1, wherein the permeated water supplied to the final-stage module is adjusted to be alkaline.

5. The water treatment apparatus according to claim 4, wherein a pH of the permeated water supplied to the final-stage module is in a range of 8 to 12.

6. The water treatment apparatus according to claim 1, wherein the permeated water supplied to the final-stage module is discharged from a concentrate side of at least one pre-final module supplying the permeated water to the final-stage module.

7. The water treatment apparatus according to claim 1 further comprising:
   a pressure vessel,
   wherein a plurality of pre-final modules are provided as the at least one pre-final module,
   each of the plurality of pre-final modules is a spiral module formed by winding a composite reverse osmosis membrane around a water-collecting pipe,
   the plurality of pre-final modules are connected with each other by connecting their water-collecting pipes,
   the plurality of pry-final modules thus connected are contained in the pressure vessel,
   raw water to be treated is supplied to and permeated water is discharged from one end of the pressure vessel, concentrated water and permeated water are discharged from the other end of the pressure vessel, and the permeated water discharged from the other end is supplied to the final-stage module.

8. The water treatment apparatus according to claim 7, wherein an interior space of the connected water-collecting pipes is divided into two separate spaces by a partition to separate permeated water on a raw water side and permeated water on a concentrated side.

9. The water treatment apparatus according to claim 1 further comprising:

a plurality of pressure vessels arranged in multi-stages, the plurality of pressure vessels including a first-stage pressure vessel and at least one pressure vessel subsequent to the first-stage pressure vessel, wherein a plurality of pre-final modules are provided as the at least one pre-final module, each of the plurality of pre-final modules is a spiral module formed by winding a composite reverse osmosis membrane around a water-collecting pipe, the plurality of pre-final modules are connected with each other by connecting their water-collecting pipes, the plurality of pre-final modules thus connected are contained in the plurality of pressure vessels, the first-stage pressure vessel is supplied with raw water to be treated, the at least one pressure vessel subsequent to the first-stage pressure vessel is supplied with concentrated water discharged from at least one preceding pressure vessel, and the final-stage module is supplied with permeated water discharged from the at least one pressure vessel subsequent to the first-stage pressure vessel.

10. The water treatment apparatus according to claim 9, wherein three pressure vessels are arranged in three stages, and permeated water from a second-stage pressure vessel and/or a third-stage pressure vessel is supplied to a final-stage composite reverse osmosis membrane.

11. The water treatment apparatus according to claim 1, wherein the at least one pre-final module has a salt rejection of at least 99% and a permeate flux of at least 0.2 m3/m2·day when the apparatus is operated using as a feed solution a 3.5 wt % salt water at a pH of 6.5, a water temperature of 25° C., and an operational pressure of 5.5 Mpa.

12. The water treatment apparatus according to claim 1, wherein the at least one pre-final module has a salt rejection of at least 99.5% and a permeate flux of at least 0.3 m3/m2·day when the apparatus is operated using as a feed solution a 3.5 wt % salt water at a pH of 6.5, a water temperature of 25° C., and an operational pressure of 5.5 Mpa.

13. The water treatment apparatus according to claim 1, wherein the at least one pre-final module has a boron rejection of at least 80% when the apparatus is operated using as a feed solution a 3.5 wt % salt water containing 5 ppm of boron at a pH of 6.5, a water temperature of 25° C., and an operational pressure of 5.5 Mpa.

14. The water treatment apparatus according to claim 1, wherein the at least one pre-final module has a boron rejection of at least 90% when the apparatus is operated using as a feed solution a 3.5 wt % salt water containing 5 ppm of boron at a pH of 6.5, a water temperature of 25° C., and an operational pressure of 5.5 Mpa.

15. The water treatment apparatus according to claim 1, wherein the final-stage module has a salt rejection of at least 98% and a permeate flux of at least 0.5 m3/m2·day when the apparatus is operated using as a feed solution a 0.05 wt % salt water at a pH of 6.5, a water temperature of 25° C., and an operational pressure of 0.75 Mpa.

16. The water treatment apparatus according to claim 1, wherein the final-stage module has a salt rejection of at least 99.0% and a permeate flux of at least 0.7 m3/m2·day when the apparatus is operated using as a feed solution a 0.05 wt % salt water at a pH of 6.5, a water temperature of 25° C., and an operational pressure of 0.75 Mpa.

17. The water treatment apparatus according to claim 3, wherein a concentration of total dissolved solids (TDS) in the raw water supplied to the apparatus is at least 1 wt %.

18. The water treatment apparatus according to claim 17, wherein the raw water supplied to the apparatus is seawater.

19. The water treatment apparatus according to claim 3, wherein the raw material supplied to the apparatus is seawater, and a concentration of boron in permeated water discharged from or recovered in the apparatus is 1 mg/l or less.

* * * * *

UNITED STATES PATENT AND TRADEMARK OFFICE
CERTIFICATE OF CORRECTION

PATENT NO. : 6,805,796 B2
DATED : October 19, 2004
INVENTOR(S) : Masahiko Hirose et al.

It is certified that error appears in the above-identified patent and that said Letters Patent is hereby corrected as shown below:

Column 12,
Line 62, please replace the word "pry-final" with -- pre-final --.

Signed and Sealed this

Tenth Day of May, 2005

JON W. DUDAS
*Director of the United States Patent and Trademark Office*